(12) United States Patent
Price et al.

(10) Patent No.: US 12,095,978 B2
(45) Date of Patent: Sep. 17, 2024

(54) PERSPECTIVE-DEPENDENT DISPLAY OF SURROUNDING ENVIRONMENT

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 17/655,964

(22) Filed: Mar. 22, 2022

(65) Prior Publication Data

US 2023/0308631 A1   Sep. 28, 2023

(51) Int. Cl.
| | | |
|---|---|---|
| *H04N 13/398* | (2018.01) | |
| *G01B 11/22* | (2006.01) | |
| *G01S 17/89* | (2020.01) | |
| *H04N 13/00* | (2018.01) | |
| *H04N 13/239* | (2018.01) | |
| *H04N 13/383* | (2018.01) | |

(52) U.S. Cl.
CPC .......... *H04N 13/398* (2018.05); *G01B 11/22* (2013.01); *G01S 17/89* (2013.01); *H04N 13/239* (2018.05); *H04N 13/383* (2018.05); *H04N 2013/0081* (2013.01)

(58) Field of Classification Search
CPC ......... H04N 2013/0081; H04N 13/239; H04N 13/398; G01S 17/89; G01B 11/22
See application file for complete search history.

(56) References Cited

U.S. PATENT DOCUMENTS

| | | | |
|---|---|---|---|
| 2015/0317834 A1* | 11/2015 | Poulos ...................... | G06T 7/60 345/619 |
| 2017/0115488 A1 | 4/2017 | Ambrus et al. | |
| 2021/0358156 A1 | 11/2021 | Price et al. | |

OTHER PUBLICATIONS

"International Search Report and Written Opinion Issued in PCT Application No. PCT/US22/053634", Mailed Date: Apr. 4, 2023, 10 Pages.

* cited by examiner

*Primary Examiner* — On S Mung
(74) *Attorney, Agent, or Firm* — Alleman Hall & Tuttle LLP

(57) ABSTRACT

Examples are disclosed that relate to providing image data to a user in a defined space of a surrounding environment from a perspective of the user. One example provides a computing system, comprising a logic subsystem, and a storage subsystem comprising instructions executable by the logic subsystem to obtain information regarding a pose of a user within a defined space, based upon the pose of the user, determine a portion of an environment surrounding the defined space toward which the user is looking, obtain image data representing the portion of the environment from a perspective of the user, and provide the image data for display via a display device within the defined space.

20 Claims, 6 Drawing Sheets

PERSPECTIVE-DEPENDENT DISPLAY OF SURROUNDING ENVIRONMENT

BACKGROUND

Cameras are often used to provide real-time views of spaces that are not directly viewable. For example, vehicle cameras may image a surrounding environment outside of a vehicle, such as to assist a driver with parking or driving in reverse. As another example, a security camera may be positioned outside of a building to provide images to a display inside the building. However, such technologies display image data from a static perspective of the cameras. As such, it may be difficult for a user to correctly perceive the spatial relationships of objects in the environment with respect to the defined space. Further, multiple users within the same defined space may have different perspectives relative to the objects outside of the defined space.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to providing, to a user in a defined space, image data from a perspective of the user of an environment surrounding the defined space. One example provides a computing system comprising a logic subsystem, and a storage subsystem comprising instructions executable by the logic subsystem. The instructions are executable to obtain information regarding a pose of a user within a defined space; based upon the pose of the user, determine a portion of an environment surrounding the defined space toward which the user is looking; obtain image data representing the portion of the environment from a perspective of the user; and provide the image data for display via a display device within the defined space.

DETAILED DESCRIPTION

Figure 1:
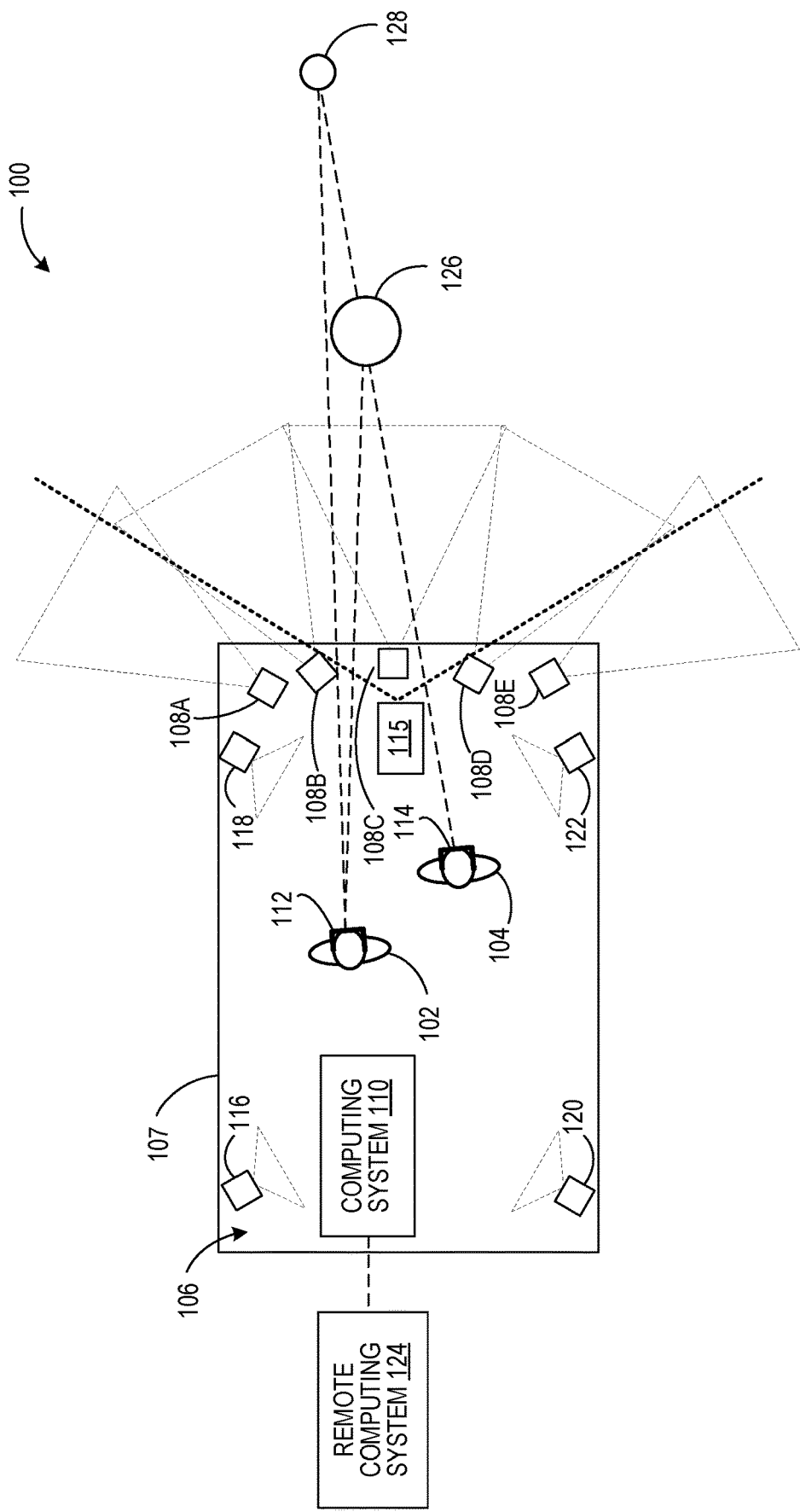
FIG. 1 schematically shows an example scenario in which image data representing an environment outside of a defined space is displayed to users inside the defined space via head-mounted display devices.

As mentioned above, cameras may be used to provide real-time views of spaces that are not directly viewable, such as an environment surrounding a space defined by an opaque structure. Current technologies may display video feeds from cameras imaging the surrounding environment to users inside the defined space. However, such technologies display image data from the perspective of the cameras. For example, a camera that is statically mounted to a vehicle portrays the view of the environment from the perspective of the camera location, which is a different perspective than that of a user inside the vehicle. Thus, it may be difficult for a user to correctly perceive the spatial relationships of objects in the environment with respect to the vehicle. For example, it may not be clear which objects in the environment are closer or farther to the user from an image captured by a camera having a different perspective than the user due to parallax. Further, multiple users within the same defined space may have different perspectives within the defined space, which may affect differently how each user perceives the environment with respect to the defined space.

Accordingly, examples are disclosed herein that relate to displaying, on a display device in a defined space, image data representing an environment surrounding the defined space from a perspective of a user of the display device. The term "defined space" represents any space with a boundary that at least partially occludes a view of the surrounding environment from a perspective inside of the space. Briefly, a computing system constructs a depth map of at least a portion of an environment surrounding the defined space. The term "depth map" as used herein refers to any three-dimensional representation of an environment. Examples of depth maps include three-dimensional point cloud data and three-dimensional mesh data. The depth map may be constructed using stereo imaging methods, and/or using a depth sensor such as a LIDAR (Light Detection And Ranging) sensor or one or more depth cameras. Also, one or more cameras are used to acquire intensity data (e.g. color image data) for at least a portion of the environment surrounding the defined space. The intensity data is then associated with depth map locations.

Further, the computing system may obtain information regarding a pose of a user within the defined space, and based upon the pose of the user, determine a portion of an environment surrounding the defined space toward which the user is looking. The computing system further obtains image data representing the portion of the environment from a perspective of the user, for example, by determining a portion of the depth map toward which the user is looking. This may be performed using all depth pixels that overlap with the user's field of view. The computing system then generates an image for display based upon the intensity data for depth map locations that are within the field of view of the user. The image then may be provided for display via a display device within the defined space. In various examples, the image data may be displayed via a head-mounted display device (HMD) worn by the user within the defined space, a display panel positioned within the defined space, or other suitable display device. In this manner, a view of the environment as acquired by the one or more cameras is reprojected to a perspective of the user, thereby providing a view of the surrounding environment without occlusion or parallax issues arising from the different perspective of the camera(s).

FIG. 1 shows an example use scenario 100 in which users 102 and 104 are within a defined space 106. In some examples, defined space 106 may represent a suitable vehicle, such as a car, a truck, an armored vehicle, an aircraft, or a watercraft such as a boat or submarine. In other examples, defined space 106 may represent a stationary space, such as building, an underground space, or an outdoor space having surrounding structures.

A structure 107 defining the defined space (e.g. a vehicle body, or walls of a building) may at least partially occlude a view of the surrounding environment from the user. Thus, a plurality of cameras 108A-108E are arranged to image at least a portion of the environment surrounding defined space 106. A computing system 110 local to the defined space (e.g. an onboard computer for a vehicle) may receive the image data acquired by plurality of cameras 108A-108E. In the depicted example, cameras 108A-108E are shown as imaging a combined angular range of just under 180 degrees. In other examples, cameras may image any other suitable angular range, including angles less than and greater than the example of FIG. 1. In some examples, cameras may image an angular range of 360 degrees around a defined space.

Users 102 and 104 are wearing head-mounted display (HMD) devices 112 and 114, respectively. HMDs 112, 114 may comprise augmented reality HMDs or virtual reality HMDs in various examples. Computing system 110 is configured generate image data representing the environment surrounding the defined space from the perspective of each user 102, 104. To do so, computing system 110 obtains information regarding a pose of each user 102 and 104 in defined space 106. In some examples, the pose of each user 102, 104 may be determined from one or more imaging devices fixed in a reference frame of the defined space and configured to image the user within the defined space. In FIG. 1, four such imaging devices are depicted as 116, 118, 120 and 122. Examples of such imaging devices may include stereo camera arrangements and depth sensors. In other examples, the pose of each user 102, 104 may be determined by HMDs 112, 114. For example, each HMDs 112, 114 may be configured to track a location of the HMD within defined space 106 using data from sensors located on the HMD. As a more detailed example, each HMD 112, 114 may include one or more cameras and/or one or more depth sensors that face outwardly from the HMD to image the environment in which the HMD is located. Each HMD 112, 114 further may include an inertial measurement unit. In some examples, magnetic tracking sensors alternatively or additionally may be used. Using data from such sensors, each HMD 112, 114 may construct a depth map of an interior of the defined space, and determine a location of the HMD within the depth map, e.g. using Simultaneous Localization and Mapping (SLAM) algorithms. This location, as well as the generated map of the interior of the defined space, may be provided to computing system 110.

Further, as mentioned above, computing system 110 may be configured to generate a depth map of the environment surrounding defined space 106 via data from cameras 108A-108E. In some examples, each camera 108A-108E is configured to acquire intensity image data for a portion of the surrounding environment. The cameras have known spatial relationships relative to one another. Further, as shown in FIG. 1, the fields of view (FOVs) of adjacent cameras overlap. As such, stereo imaging techniques may be used to determine distances for objects in the surrounding environment to generate a depth map. In other examples, an optional depth sensor 115 separate from cameras 108A-108E may be used to obtain a depth map of the surrounding environment. Example depth sensors include a LIDAR sensor and one or more depth cameras. In such examples, the fields of view of cameras that acquire intensity image optionally may not overlap.

Intensity data from the cameras is associated with each location in the depth map, such as each vertex in a mesh, or each point in a point cloud. In some examples, intensity data from each camera 108A-108E is stored separately. In other examples, intensity data from the cameras is computationally combined to form computationally combined intensity data for each location in the depth map. For example, where a depth map location is imaged by sensor pixels of two or more different cameras, the pixel values from the two or more different cameras can be computationally combined and then stored for the depth map location.

Next, based at least upon the pose of each user 102, 104, computing system 110 may determine a portion of the environment surrounding the defined space toward which each user 102, 104 is looking, obtain image data representing the portion of the environment from a perspective of each user 102, 104, and provide the image data to each of HMDs 112, 114 for display to users 102, 104. For example, by knowing the pose of a user within defined space 106, and the spatial relationship of the depth map of the surrounding environment to defined space 106, the pose of each user can be associated with the depth map. Then, a field of view of each user may be defined and projected onto the depth map to determine a portion of the depth map that is within the field of view of the user. Next, a technique such as ray casting may be used to determine locations in the depth map that are viewable within the FOV. Then, intensity data associated with those locations may be used to form an image for display. Computing system 110 optionally may be in communication with a remote computing system 124, such as a cloud service. In such examples, one or more of such processing steps may be performed by remote computing system 124.

In this manner, different users within a defined space may each view an image of the surrounding environment from a personal perspective. In the depicted example, the image displayed by HMD 112 from the perspective of user 102 may include a view of object 126 and object 128 in the environment, while a view of object 128 may be occluded by object 126 in the image displayed by HMD 114 from the perspective of user 104.

Figure 2:
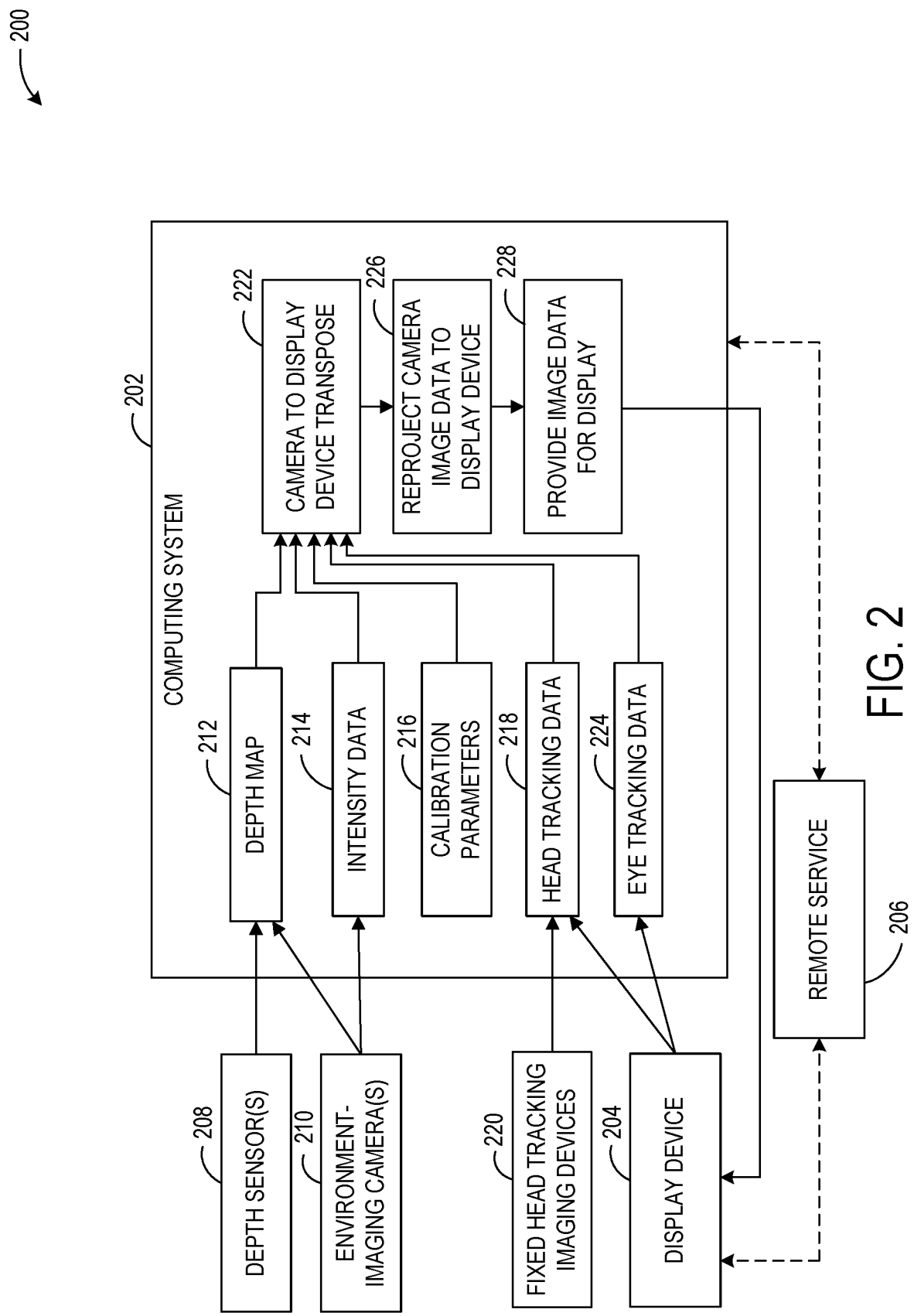
FIG. 2 shows a block diagram of an example system configured to provide image data of an environment surrounding a defined space from a perspective of a user within the defined space.

FIG. 2 schematically shows a block diagram of an example system 200 configured to display images of an environment surrounding a defined space to a user within the defined space from a perspective of the user. System 200 comprises a computing system 202 that is local to a defined space, and a display device 204 located within the defined space to display images to a user within the defined space. Computing system 110 of FIG. 1 is an example of computing system 202, and HMDs 112, 114 of FIG. 1 are examples of display device 204. Computing system 202 and display device 204 each may communicate with a remote computing service 206, such as a cloud computing service, in some examples. System 200 further includes one or more cameras 210 configured to image the environment. In some examples, camera(s) 210 are used to acquire both intensity data and depth data by acting as passive stereo cameras and using stereo imaging methods. In other examples, one or more depth sensors 208 optionally may be used to acquire depth data for the environment surrounding the defined space. Any suitable depth sensors may be used, such as LIDAR sensor(s), time-of-flight depth sensor(s), and/or structured light depth sensor(s).

Computing system 202 comprises instructions executable to construct a depth map 212 of the environment via the depth data. Depth map 212 may take any suitable form, such as a 3D point cloud or a mesh. As mentioned above, computing system 202 also may receive and store intensity data 214 associated with each location in depth map 212 based upon image data acquired by one or more cameras 210.

The relative spatial positions of depth sensor(s) 208 and camera(s) 210 are calibrated to one another and to the geometry of the defined space. As such, FIG. 2 illustrates calibration parameters 216 that may be used as inputs to help transpose the views of cameras 210 and depth sensor(s) 208 to a pose of a user, and thereby help reproject image data from a camera perspective to a user perspective for display. Example calibration parameters 216 may include, effective focal length, yaw, pitch and roll angles, principal point, and distortion parameters for the camera lenses.

In some examples, a continual extrinsic calibration may be performed to calibrate the position of display device 204 to depth map 212, as display device 204 and/or defined space (e.g. a vehicle) may be constantly moving with respect to the surrounding environment. Calibration of display device 204 to depth map 212 may be performed at a frame rate of a display of display device 204, for example.

Computing system 202 may further obtain information regarding a pose of the user within the defined space. The pose of the user may more specifically refer to a head location and a head orientation, which help to determine a portion of an environment surrounding the defined space toward which the user is looking. Computing system 202 is configured to receive head tracking data 218, for example from HMD 204. Head tracking data 218 may additionally or alternatively be received from one or more imaging devices (e.g. cameras and/or depth sensors) fixed in a reference frame of the defined space.

Computing system 202 uses depth map 212 and corresponding intensity data 214 in combination with the pose of the user as determined from head tracking data 218 to determine image data from a perspective of a user of display device 204 for display, as described above. The displayed image data represents a portion of the environment surrounding the defined space toward which the user is looking, from a perspective of the user. For example, computing system 202 may determine the portion of the environment toward which the user is looking based upon the pose of the user, project a field of view of the user onto the depth map, and then obtain intensity data for depth map locations that are viewable from the perspective of the user (e.g. locations that are within the field of view and not occluded by other depth map locations). This is illustrated in FIG. 2 as camera to display device transpose 222.

Computing system 202 then forms image data for display that comprises the intensity data obtained. This is illustrated in FIG. 2 as reproject camera image data to display device 226. Then, at 228, the image data is provided to display device 204 for display. While depicted as being performed by computing system 202, these processes may be performed at least in part by remote service 206 in some examples. Further, in some examples, one or more of the above-described processes may be performed on display device 204.

In some examples, the reprojection of the camera images to the perspective of the user display device 204 may further be based on eye tracking data 224 as determined from eye tracking cameras on display device 204. Eye tracking data may include data such as eye positions and interpupillary distances. Thus, in addition to transposing the camera image data to display device 204, the image data may be further transposed from display device 204 to the user's eyes.

In some examples, image data that is provided to the display device for display may undergo late stage reprojection within a frame buffer of display device 204. Late stage reprojection may be used, for example, to update positions of objects in a rendered image directly before the rendered image is displayed. Here, where display device 204 is in a vehicle that is moving, image data in a frame buffer of display device 204 may be reprojected based upon a distance traveled by the vehicle between image formation at 226 and image display. In some examples, computing system 202 may provide motion vectors to display device 204 based upon vehicle motion for use in late stage reprojection. In other examples, motion vectors may be determined from data from a local inertial measurement unit on the display device 204.

In some examples, a frame rate of intensity data acquired by camera(s) 210 may differ from a frame rate of the depth map acquired by depth sensor 208. For example, the frame rate for acquiring the depth map may be lower than the frame rate for acquiring intensity data (e.g. to save bandwidth). Likewise, the frame rates may be varied depending on changes in vehicle speed, based on objects in the environment moving, and/or other environmental factors. In such examples, intensity data and/or depth data may be translated prior to associating the intensity data with the depth map locations to correct for motion that occurred between the time the intensity data was obtained and the time the depth map was obtained.

Where a plurality of cameras 210 are used to obtain intensity data, objects in the environment surrounding the defined space may appear in image data from more than one camera 210. In some such examples, intensity data from each camera that imaged the object may be reprojected to the user perspective. In other examples, intensity data from one camera, or a subset of cameras, that imaged the object, may be reprojected to the user perspective. This may utilize fewer computing resources than transposing image data from all cameras that imaged the object to the user perspective. In some such examples, image data from a camera having a perspective determined to be closest to the perspective of the user may be used (e.g. by comparing the field of view of the user with the fields of view of each camera). In yet other examples, pixel intensity data from a plurality of cameras for a selected depth map location may be averaged or otherwise computationally combined and then stored for the depth map location.

Figure 3:
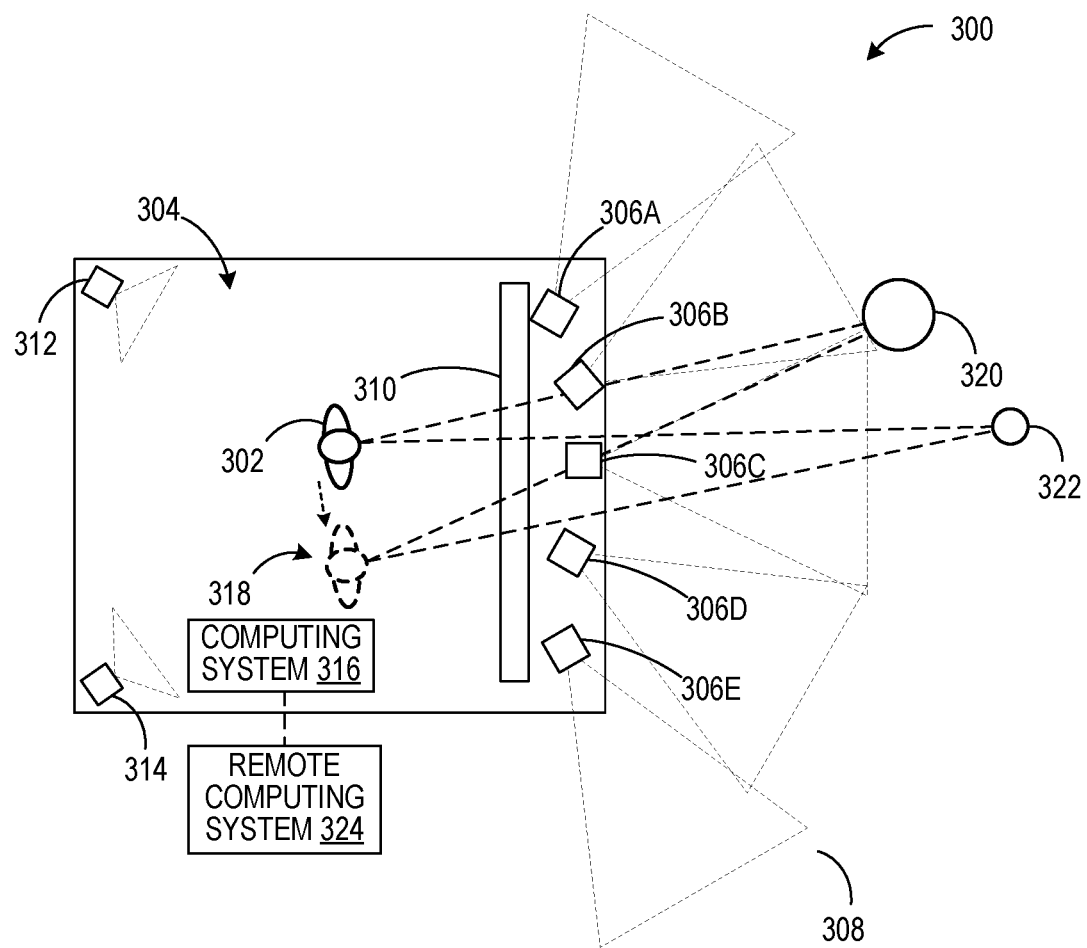
FIG. 3 schematically shows an example scenario in which image data representing an environment outside of a defined space is displayed to a user inside the defined space via a display panel.

In the example of FIG. 1, users 102 and 104 view the perspective-dependent images generated by computing system 110 via HMDs 112, 114. In other examples, other types of display devices may be used for image presentation, such as display panels. FIG. 3 schematically shows an example scenario 300 in which user 302 is in a defined space 304 surrounded by an environment being imaged by cameras 306A-306E. The user is viewing image data acquired by cameras 306A-306E on a display panel that is at a fixed location within defined space 304. However, instead of displaying the images from the perspectives of cameras 306A-306E, the image data from cameras 306A-306E is associated with a depth map that is determined from the image data, or from data acquired by a depth sensor (not shown in FIG. 3), as described above with regard to FIGS.

1 and 2. This allows the image data to be transposed to the perspective of user 302. Cameras 312, 314 image an interior of defined space 304 to perform user pose tracking (e.g. head tracking). One or more depth sensors alternatively or additionally may be used for user pose determination. Based upon user pose data determined via data from cameras 312, 314, image data from a perspective of user 302 may be displayed on display panel 310. In this example reprojection of the image data to the perspective of user 302 may include a user pose to display panel transpose, in addition to the operations described above with regard to FIG. 2, as the position of user 302 with regard to the display panel changes as the user moves within defined space 304. This is illustrated by updated user pose 318. As such, when user 302 moves to a new location 318, objects 320, 322 in the environment will be displayed from a different perspective compared to an original location of user 302. Computing system 316 optionally may be in communication with a remote computing system 324, such as a cloud service. In such examples, various processes described herein may be performed by computing system 316.

Figure 4:
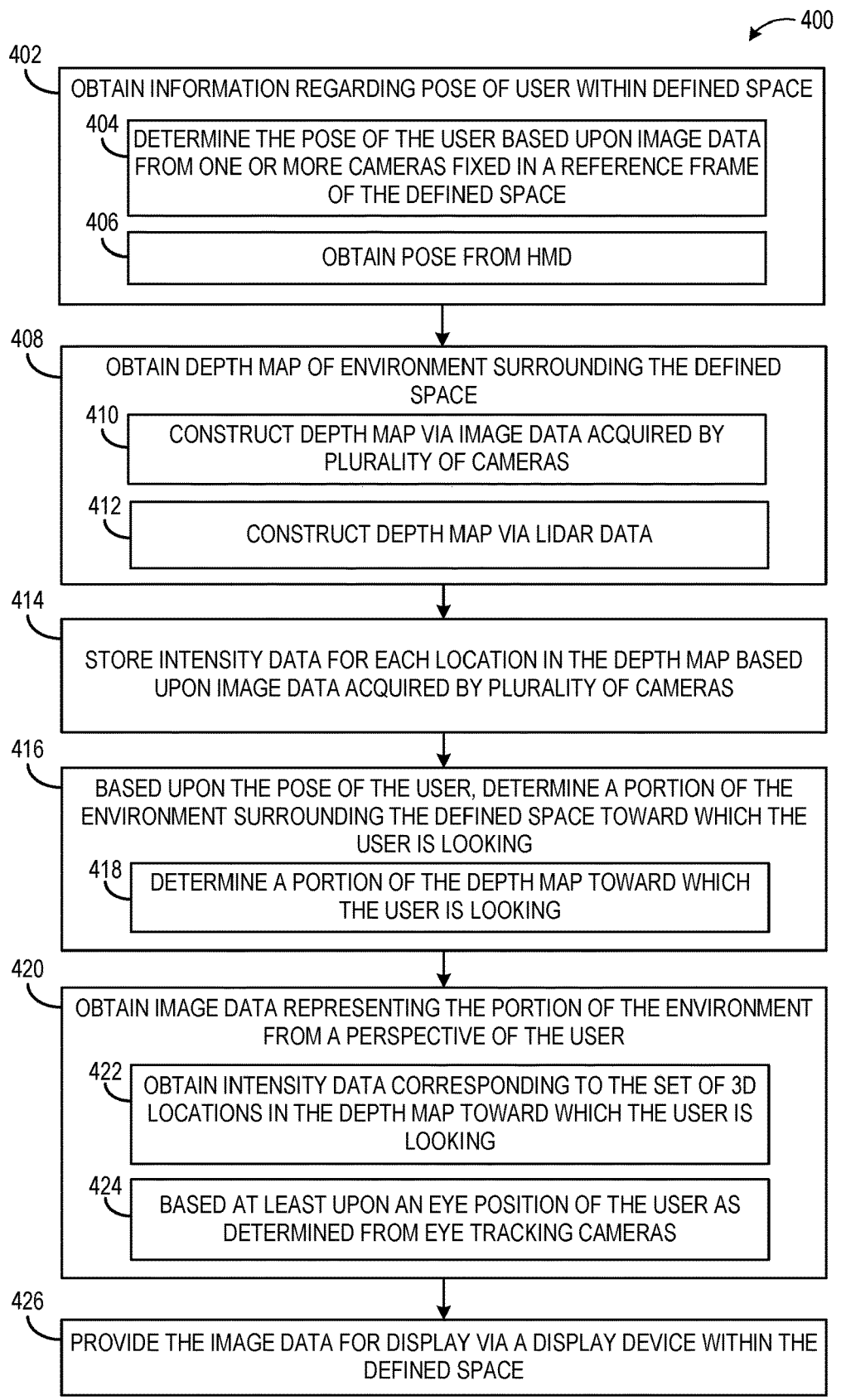
FIG. 4 is a flow diagram of an example method of providing image data of an environment surrounding a defined space for display.

FIG. 4 shows an example method 400 of providing image data of an environment surrounding a defined space for display from a perspective of a user within the defined space. Method 400 may be enacted on a computing system, for example computing system 110, computing system 202, computing system 316. In some examples, various processes of method 400 may be performed by a remote computing system. Method 400 includes, at 402, obtaining information regarding a pose of a user within a defined space. As described above, the pose of the user may reflect head location and head orientation, as examples. The pose of the user may be determined based upon image data from one or more cameras fixed in a reference frame of the space, at 404. As another example, at 406, the pose of the user may be received from an HMD worn by the user, e.g. as determined based upon image data from one or more image sensors on the HMD.

Method 400 further includes, at 408, obtaining a depth map of the environment surrounding the defined space. The depth map may be constructed via image data acquired by a plurality of cameras imaging the environment, at 410, or may be constructed via LIDAR data acquired by a LIDAR sensor, at 412. In other examples, other suitable types of depth sensing may be utilized, such as time-of-flight depth imaging. Method 400 then includes, at 414, storing intensity data (e.g. visible light, RGB image data) for each location in the depth map based upon image data acquired by the plurality of cameras imaging the environment.

Next, method 400 includes, at 416, based upon the pose of the user, determining a portion of the environment surrounding the defined space toward which the user is looking. This may include, at 418, determining a portion of the depth map toward which the user is looking. In some examples, a field of view of the user may be projected onto the depth map to determine locations in the depth map that are viewable from the perspective of the user. Method 400 further includes, at 420, obtaining image data representing the portion of the environment from a perspective of the user. This may comprise obtaining intensity data corresponding to the portion of the depth map toward which the user is looking, at 422. In some examples, image data may be obtained based at least upon an eye position of the user as determined from eye tracking cameras on an HMD, at 424. Method 400 further includes, at 426, providing the image data for display via display device within the defined space, such as an HMD or display panel.

Figure 5:
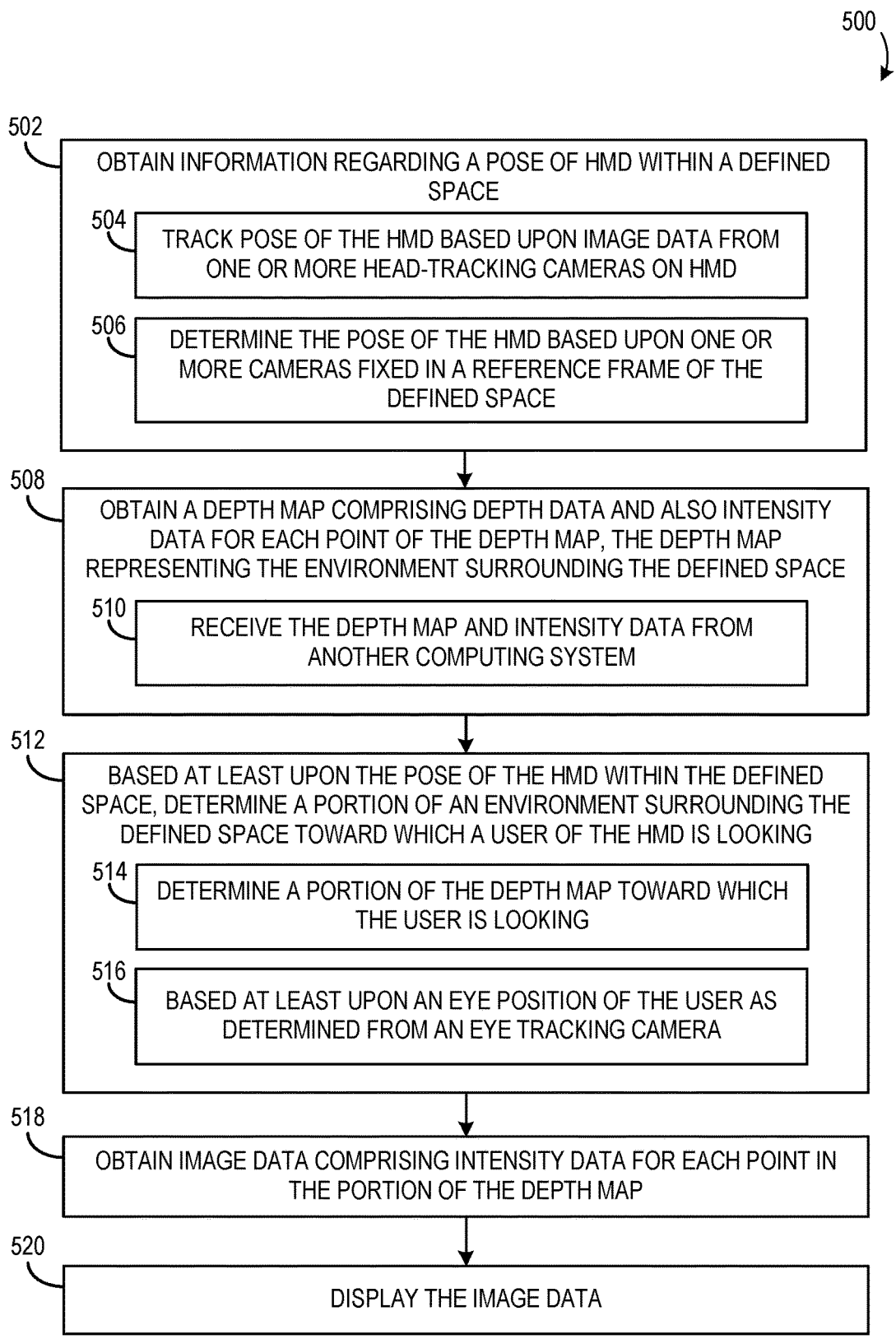
FIG. 5 is a flow diagram of an example method of displaying image data of an environment surrounding a defined space to a head-mounted display device within the defined space.

As mentioned above, in some examples, a perspective-dependent image may be computed on an HMD, rather than on another computing device in communication with the HMD. FIG. 5 shows a flow diagram illustrating an example method 500 of displaying, via an HMD, image data of an environment surrounding a defined space to a user within the defined space from a perspective of the user. HMDs 112, 114, and display device 204 in FIGS. 1 and 2 are examples of HMDs on which method 500 may be performed. Method 500 includes, at 502, obtaining information regarding a pose of the HMD within a defined space. The pose of the HMD may be tracked based upon image data from one or more head-tracking cameras on the HMD, at 504. Additionally or alternatively, the pose of the HMD may be determined based upon one or more cameras fixed in a reference frame of the defined space, at 506, where the one or more fixed cameras are in communication with the HMD. Method 500 further includes, at 508, obtaining a depth map comprising depth data and also intensity data for each location of the depth map, where the depth map represents the environment surrounding the defined space. In some examples, the depth map and intensity data may be computed on the HMD via image data from cameras that image the environment surrounding the defined space. In other examples, the depth map and the intensity data may be received from another computing system, at 510. In various examples, the intensity data may comprise pixel intensity values for each camera, and/or computationally combined pixel values from a plurality of pixels, each computationally combined pixel value associated with a location in the depth map.

Method 500 further includes, at 512, based at least upon the pose of the HMD within the defined space, determining a portion of an environment surrounding the defined space toward which a user of the HMD is looking. This may include, at 514, determining a portion of the depth map toward which the user is looking. The portion of the environment/depth map toward which the user is looking may be further based at least upon an eye position of the user as determined from an eye tracking camera on the HMD, at 516. Method 500 further includes, at 518, obtaining image data comprising intensity data for each location in the portion of the depth map, and at 520, displaying the image data.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
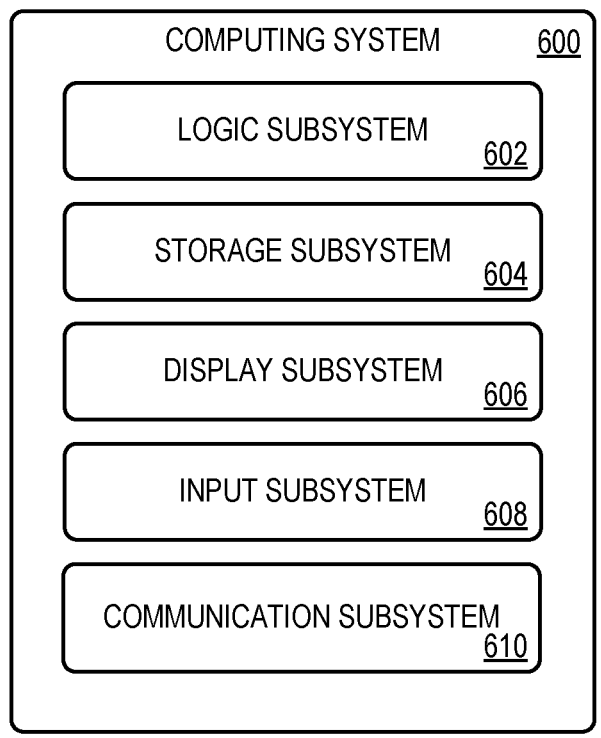
FIG. 6 is a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic subsystem 602 and a storage subsystem 604. Computing system 600 may optionally include a display subsystem 606, input subsystem 608, communication subsystem 610, and/or other components not shown in FIG. 6. Computing system 110, remote computing system 124, HMDs 112, 114, computing system 202, display device 204, remote service 206, computing system 316, and remote computing system 324 are examples of computing system 600.

Logic subsystem 602 includes one or more physical devices configured to execute instructions. For example, logic subsystem 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 602 may include one or more processors configured to execute software instructions. Additionally or alternatively, logic subsystem 602 may include one or more hardware or firmware logic machines configured to execute hardware or firmware instructions. Processors of logic subsystem 602 may be single-core or multi-core, and the instructions executed thereon may be configured for sequential, parallel, and/or distributed processing. Individual components of logic subsystem 602 optionally may be distributed among two or more separate devices, which may be remotely located and/or configured for coordinated processing. Aspects of logic subsystem 602 may be virtualized and executed by remotely accessible, networked computing devices configured in a cloud-computing configuration.

Storage subsystem 604 includes one or more physical devices configured to hold instructions executable by logic subsystem 602 to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a computing system, comprising a logic subsystem, and a storage subsystem comprising instructions executable by the logic subsystem to obtain information regarding a pose of a user within a defined space, based upon the pose of the user, determine a portion of an environment surrounding the defined space toward which the user is looking, obtain image data representing the portion of the environment from a perspective of the user, and provide the image data for display via a display device within the defined space. The defined space may additionally or alternatively include a vehicle. The computing system may additionally or alternatively include a plurality of cameras configured to image the environment surrounding the defined space, and wherein the instructions are executable to construct a depth map of the environment surrounding the defined space via image data acquired by the plurality of cameras. The instructions may additionally or alternatively be executable to store intensity data for each location in the depth map based upon image data acquired by the plurality of cameras. The computing system may additionally or alternatively include a depth sensor configured to acquire depth data of the environment surrounding the defined space, and wherein the instructions are executable to construct a depth map of the environment surrounding the defined space via the depth data. The depth sensor may additionally or alternatively include a LIDAR sensor. The computing system may additionally or alternatively include a plurality of cameras configured to image the environment surrounding the defined space, and wherein the instructions are executable to store intensity data for each location in the depth map based upon image data acquired by the plurality of cameras. The instructions may additionally or alternatively be executable to obtain the image data representing the portion of the environment from the perspective of the user by obtaining intensity data for each location in the depth map corresponding to the portion of the environment surrounding the defined space toward which the user is looking. The display device within the defined space may additionally or alternatively include a head-mounted display device, and wherein the instructions are further executable to obtain the image data representing the portion of the environment from a perspective of the user within the defined space based at least upon an eye position of the user as determined from eye tracking cameras of the head-mounted display device. The display device within the defined space may additionally or alternatively include a display panel. The computing system may additionally or alternatively include instructions executable to determine the pose of the user based upon one or more of image data from one or more cameras within the defined space, inertial measurement unit data, or magnetic tracking data.

Another example provides a head-mounted display device, comprising a display device, a logic subsystem, and a storage subsystem comprising instructions executable by the logic subsystem to obtain a depth map and also intensity data for each location of the depth map, the depth map representing an environment surrounding a defined space, obtain information regarding a pose of the head-mounted display device inside of the defined space, based at least upon the pose of the head-mounted display device, determine a portion of the depth map toward which a user of the head-mounted display device is looking, obtain image data comprising intensity data for each location in the portion of the depth map, and display, via the display device, the image data. The head-mounted display device may additionally or alternatively include an eye tracking camera, and wherein the instructions are executable to determine the portion of the depth map based at least upon an eye position of the user as determined from the eye tracking camera. The defined space may additionally or alternatively include a vehicle interior, and wherein the depth map is obtained via one or more cameras mounted to the vehicle. The instructions may additionally or alternatively be executable to reproject the image data based on a motion of the head-mounted display prior to display of the image data. The head-mounted display device may additionally or alternatively include one or more head-tracking cameras, and wherein the instructions are executable to track the pose of the head-mounted display device inside of the defined space based on image data from the one or more head-tracking cameras.

Another example provides, on a computing system, a method comprising, obtaining information regarding a pose of a user within a defined space that is at least partially enclosed by a structure, based at least upon the pose of the user within the defined space, determining a portion of an environment surrounding the defined space toward which the user is looking, obtaining image data representing the portion of the environment from a perspective of the user, and providing the image data for display to a display device within the defined space. The method may additionally or alternatively include constructing a depth map of the environment surrounding the defined space and storing intensity data for each location in the depth map, and wherein obtaining the image data comprises obtaining intensity data for each location in the depth map corresponding to the portion of the environment surrounding the defined space toward which the user is looking. The computing system may additionally or alternatively include a head-mounted display device, and further comprising determining the pose of the user based upon image data from one or more image sensors on the head-mounted display device. The method may additionally or alternatively include determining the pose of the user based upon image data from one or more cameras fixed in a reference frame of the defined space.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a logic subsystem; and
a storage subsystem comprising instructions executable by the logic subsystem to:
obtain information regarding a pose of a user within a defined space,
based upon the pose of the user, determine a portion of a surrounding environment outside the defined space toward which the user is looking,
obtain image data representing the portion of the surrounding environment toward which the user is looking, wherein the image data obtained comprises data acquired by one or more cameras configured to image the surrounding environment outside the defined space, and
provide the image data for display via a display device within the defined space.

2. The computing system of claim 1, wherein the defined space comprises a vehicle.

3. The computing system of claim 1, wherein the one or more cameras comprises a plurality of cameras configured to image the surrounding environment outside the defined space, and wherein the instructions are executable to construct a depth map of the surrounding environment outside the defined space via image data acquired by the plurality of cameras.

4. The computing system of claim 3, wherein the instructions are further executable to store intensity data for each location in the depth map based upon image data acquired by the plurality of cameras.

5. The computing system of claim 1, further comprising a depth sensor configured to acquire depth data of the surrounding environment outside the defined space, and wherein the instructions are executable to construct a depth map of the surrounding environment outside the defined space via the depth data.

6. The computing system of claim 5, wherein the depth sensor comprises a LIDAR sensor.

7. The computing system of claim 5, wherein the one or more cameras comprises a plurality of cameras configured to image the surrounding environment outside the defined space, and wherein the instructions are executable to store intensity data for each location in the depth map based upon image data acquired by the plurality of cameras.

8. The computing system of claim 6, wherein the instructions are executable to obtain the image data representing the portion of the surrounding environment toward which the user is looking by obtaining intensity data for each location in the depth map corresponding to the portion of the surrounding environment outside the defined space toward which the user is looking.

9. The computing system of claim 8, wherein the display device within the defined space comprises a head-mounted display device, and wherein the instructions are further executable to obtain the image data representing the portion of the surrounding environment toward which the user is looking within the defined space based at least upon an eye position of the user as determined from eye tracking cameras of the head-mounted display device.

10. The computing system of claim 1, wherein the display device within the defined space comprises a display panel.

11. The computing system of claim 10, further comprising instructions executable to determine the pose of the user based upon one or more of image data from one or more cameras configured to image an interior of the defined space, inertial measurement unit data, or magnetic tracking data.

12. A head-mounted display device, comprising:
    a display device;
    a logic subsystem; and
    a storage subsystem comprising instructions executable by the logic subsystem to:
        obtain a depth map and also intensity data for each location of the depth map, the depth map representing a surrounding environment outside a defined space, wherein the depth map and intensity data are obtained from one or more cameras configured to image the surrounding environment outside the defined space,
        obtain information regarding a pose of the head-mounted display device inside of the defined space,
        based at least upon the pose of the head-mounted display device, determine a portion of the depth map toward which a user of the head-mounted display device is looking,
        obtain image data comprising intensity data for each location in the portion of the depth map, and
        display, via the display device, the image data.

13. The head-mounted display device of claim 12, further comprising an eye tracking camera, and wherein the instructions are executable to determine the portion of the depth map based at least upon an eye position of the user as determined from the eye tracking camera.

14. The head-mounted display device of claim 12, wherein the defined space comprises a vehicle interior, and wherein the one or more cameras are mounted to the vehicle.

15. The head-mounted display device of claim 12, wherein the instructions are executable to reproject the image data based on a motion of the head-mounted display prior to display of the image data.

16. The head-mounted display device of claim 12, further comprising one or more head-tracking cameras, and wherein the instructions are executable to track the pose of the head-mounted display device inside of the defined space based on image data from the one or more head-tracking cameras.

17. On a computing system, a method comprising:
    obtaining information regarding a pose of a user within a defined space that is at least partially enclosed by a structure,
    based at least upon the pose of the user within the defined space, determining a portion of a surrounding environment outside the defined space toward which the user is looking,
    obtaining image data representing the portion of the surrounding environment toward which the user is looking, wherein the image data comprises data acquired by one or more cameras configured to image the surrounding environment outside the defined space, and
    providing the image data for display to a display device within the defined space.

18. The method of claim 17, further comprising constructing a depth map of the surrounding environment outside the defined space and storing intensity data for each location in the depth map, and wherein obtaining the image data comprises obtaining intensity data for each location in the depth map corresponding to the portion of the surrounding environment outside the defined space toward which the user is looking.

19. The method of claim 17, wherein the computing system comprises a head-mounted display device, and further comprising determining the pose of the user based upon image data from one or more image sensors on the head-mounted display device.

20. The method of claim 17, further comprising determining the pose of the user based upon image data from one or more cameras fixed in a reference frame of the defined space and configured to image an interior of the defined space.

* * * * *